US012299371B2

(12) United States Patent
Yu et al.

(10) Patent No.: US 12,299,371 B2
(45) Date of Patent: May 13, 2025

(54) DUMMY CELLS PLACED ADJACENT FUNCTIONAL BLOCKS

(71) Applicant: Taiwan Semiconductor Manufacturing Company, Ltd., Hsinchu (TW)

(72) Inventors: Chi-Yeh Yu, Hsinchu (TW); Wei-Yi Hu, Zhubei (TW); Shih-Hsuan Chien, Taoyuan County (TW); You-Cheng Xiao, Taiping (TW); Ya-Chi Chou, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 112 days.

(21) Appl. No.: 17/852,985

(22) Filed: Jun. 29, 2022

(65) Prior Publication Data
US 2023/0289508 A1    Sep. 14, 2023

Related U.S. Application Data

(60) Provisional application No. 63/318,892, filed on Mar. 11, 2022.

(51) Int. Cl.
*G06F 30/39*    (2020.01)
*G06F 30/392*    (2020.01)
*G06F 30/394*    (2020.01)
*H10B 10/00*    (2023.01)

(52) U.S. Cl.
CPC .......... *G06F 30/392* (2020.01); *G06F 30/394* (2020.01); *H10B 10/00* (2023.02)

(58) Field of Classification Search
CPC .. G06F 30/392; G06F 30/394; G06F 2119/18; G06F 30/398; H10B 10/00; H01L 27/0207
See application file for complete search history.

(56) References Cited

U.S. PATENT DOCUMENTS

| 7,895,548 | B2 | 2/2011 | Lin et al. | |
| 2009/0290401 | A1* | 11/2009 | Ouyang | G11C 5/02 365/51 |
| 2015/0287718 | A1* | 10/2015 | Shim | H01L 29/4232 257/369 |
| 2017/0365675 | A1* | 12/2017 | Chang | H01L 21/32139 |
| 2019/0340326 | A1 | 11/2019 | Huda | |

FOREIGN PATENT DOCUMENTS

| TW | 201931440 A | 8/2019 |
| TW | 202201640 A | 1/2022 |

OTHER PUBLICATIONS

Taiwan Notice of Allowance for Application No. 112103541 mailed Jun. 25, 2024.

* cited by examiner

*Primary Examiner* — Mohammed A Bashar
(74) *Attorney, Agent, or Firm* — Merchant & Gould P.C.

(57) ABSTRACT

A device including functional blocks and dummy cells. The functional blocks include a first functional block and a second functional block. Each dummy cell having a cell boundary defined by non-functioning active areas and non-functioning gates for filling space between the functional blocks and including a dummy cell configured to be situated between the first functional block and the second functional block such that the dummy cell directly abuts each of the first functional block and the second functional block.

20 Claims, 13 Drawing Sheets

DUMMY CELLS PLACED ADJACENT FUNCTIONAL BLOCKS

CROSS-REFERENCE TO RELATED APPLICATIONS

This application claims the benefit of U.S. Provisional Application No. 63/318,892, filed Mar. 11, 2022, and titled "SYSTEMS AND METHODS FOR PLACING DUMMY CELLS BETWEEN LAYOUT PATTERNS," the disclosure of which is hereby incorporated herein by reference.

BACKGROUND

Typically, a semiconductor device such as an integrated circuit (IC) includes many components connected to one another to perform the functions of the IC. Various automated tools are employed to assist IC designers in taking a functional design of an IC to a finished layout and manufacturing the IC. Often, the IC is built using a computer system that begins from a functional specification of the IC and continues through the specification of components, including functional blocks or cells, the physical arrangement of the functional blocks, and the routing of conductive paths that interconnect the functional blocks. The design, layout, and manufacturing processes can be divided into a series of stages, such as synthesis, placement, routing, and design rule checking.

Often, functional blocks are placed in the IC layout using a place and route (PnR) tool, where certain guidelines are followed to avoid design rule checking (DRC) errors. These guidelines include providing enough white space around the functional blocks, filling some of the white space with dummy cells using a generalized program and abutting functional blocks that have edge patterns designed to abut certain functional blocks. However, providing enough white space next to the functional blocks and filling the white space with dummy cells using a generalized program results in a large amount of unused white space area. This is at least in part due to using simple symmetric dummy cells that are placed stand-alone following minimum spacing/area rules. Also, this is in part due to using a generalized program that covers a broad range of scenarios. In addition, abutting functional blocks that have edge patterns designed to abut certain functional blocks results in a lack of design flexibility, since matching functional blocks only happens under limited conditions.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion. In addition, the drawings are illustrative as examples of embodiments of the disclosure and are not intended to be limiting.

DETAILED DESCRIPTION

Figure 1:
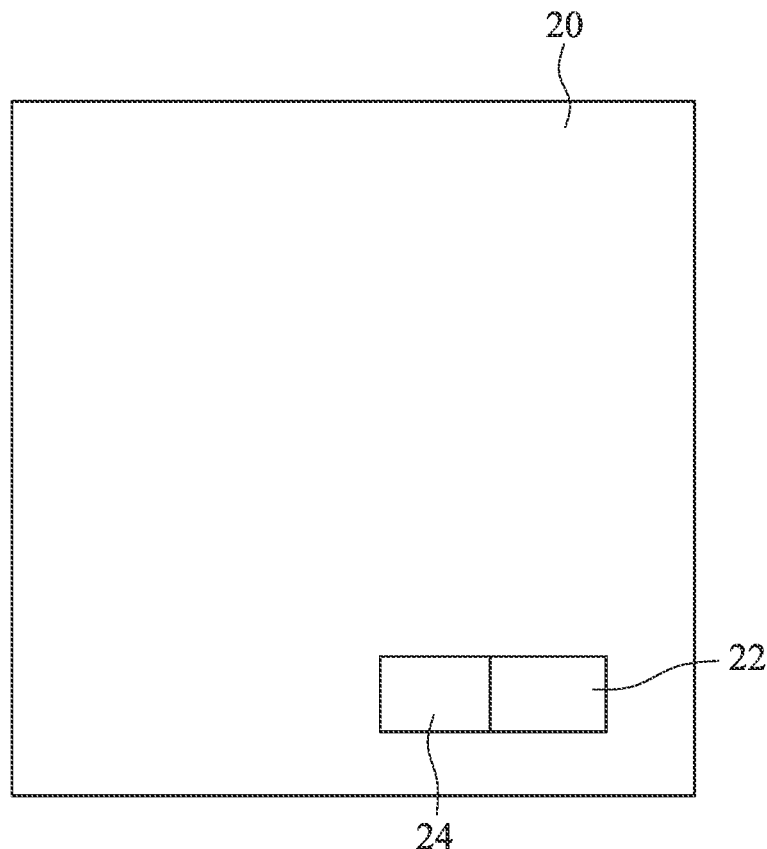
FIG. 1 is a diagram schematically illustrating a semiconductor device that includes dummy cells and functional blocks, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Disclosed embodiments provide dummy cells, referred to as pattern bridge cells, that are configured to be situated between functional blocks having known layout patterns. In some embodiments, the dummy cells are configured to be situated between selected patterns, such as between different types of standard (STD) logic cells, between different types of macro functions (macros), between STD logic cells and macros, or between STD logic cells and static random-access memory (SRAM) blocks. In some embodiments, the dummy cells are asymmetric dummy cells where, for example, the dummy cell includes a dummy active region that is not centered in the dummy cell but situated closer to one side, such as the top side, of the dummy cell and further away from the opposing side, such as the bottom side, of the dummy cell. Also, in some embodiments, the dummy cells are asymmetric dummy cells configured to be situated between the functional blocks having known layout patterns, selected patterns, and/or adjacent more complex STD cell and macro function layout patterns. In some embodiments, PnR tools assist with inserting the dummy cells.

Further disclosed embodiments include identifying patterns or styles of functional blocks and moving the functional blocks to have smaller spaces next to or around them, such that the smaller spaces are filled by one or more of the pattern bridge cells. Also, disclosed embodiments include identifying patterns or styles of functional blocks and placing selected dummy cells or selected dummy cell markers at gaps or locations next to the identified functional blocks, which can be accomplished with PnR tools, such as a floorplan (FP) checker. In some embodiments, the dummy cell markers are replaced with selected dummy cells at a later stage using a dummy cell insertion tool, such as a DRC utility or a layout editor.

In some embodiments, dummy cells are inserted along the edges of one type of functional block to bridge the one type of functional block to another type of functional block. In some embodiments, the one type of functional block with the surrounding dummy cells is inserted into the other type of functional block. In some embodiments, the one type of functional block with the surrounding dummy cells is inserted next to the other type of functional block to abut with the other type of functional block.

Advantages of the disclosed embodiments include smaller chip areas and a shorter design turn-around cycle.

FIG. 1 is a diagram schematically illustrating a semiconductor device 20, such as an IC, that includes dummy cells 22 and functional blocks 24, in accordance with some embodiments. The functional blocks 24, such as STD logic cells and macros, perform the functions of the semiconductor device 20. The dummy cells 22 fill space in the IC around and next to the functional blocks 24. The term "dummy" is used in reference to the dummy cells 22 because the dummy cells 22 are not used to perform the functions of the semiconductor device 20.

In some embodiments, the dummy cells 22 are pattern bridge cells situated between functional blocks 24 having known layout patterns. In some embodiments, the dummy cells 22 are situated between selected patterns, such as between different types of STD logic cells, between different types of macros, between STD logic cells and macros, and/or between STD logic cells and SRAM blocks. In some embodiments, the dummy cells 22 are asymmetric dummy cells situated between or next to the functional blocks 24. In some embodiments, the dummy cells 22 are situated next to more complex functional block patterns, such as next to more complex STD cell and macro layout patterns.

The dummy cells 22 can be inserted along edges of the functional blocks 24. In some embodiments, the dummy cells 22 are inserted along the edges of one type of functional block 24 to bridge the functional block 24 to another type of functional block 24. In some embodiments, the dummy cells 22 are inserted along the edges of one type of functional block 24 and the one type of functional block 24 with surrounding dummy cells 22 is inserted into another type of functional block 24. In some embodiments, the dummy cells 22 are inserted along the edges of one type of functional block 24 and the one type of functional block 24 with surrounding dummy cells 22 is inserted next to another type of functional block 24 to abut with the other type of functional block 24.

The semiconductor device 20 is designed and manufactured using various automated tools, such as PnR tools including an FP checker. The semiconductor device 20 can be designed, laid out, and manufactured by a computer system using a functional specification of the semiconductor device 20 and continuing up to the specification of components including functional blocks 24, the physical arrangement of the functional blocks 24, and the routing of conductive paths that interconnect the functional blocks 24. The design, layout, and manufacturing processes can be divided into a series of stages, such as synthesis, placement, routing, and DRC.

Figure 2:
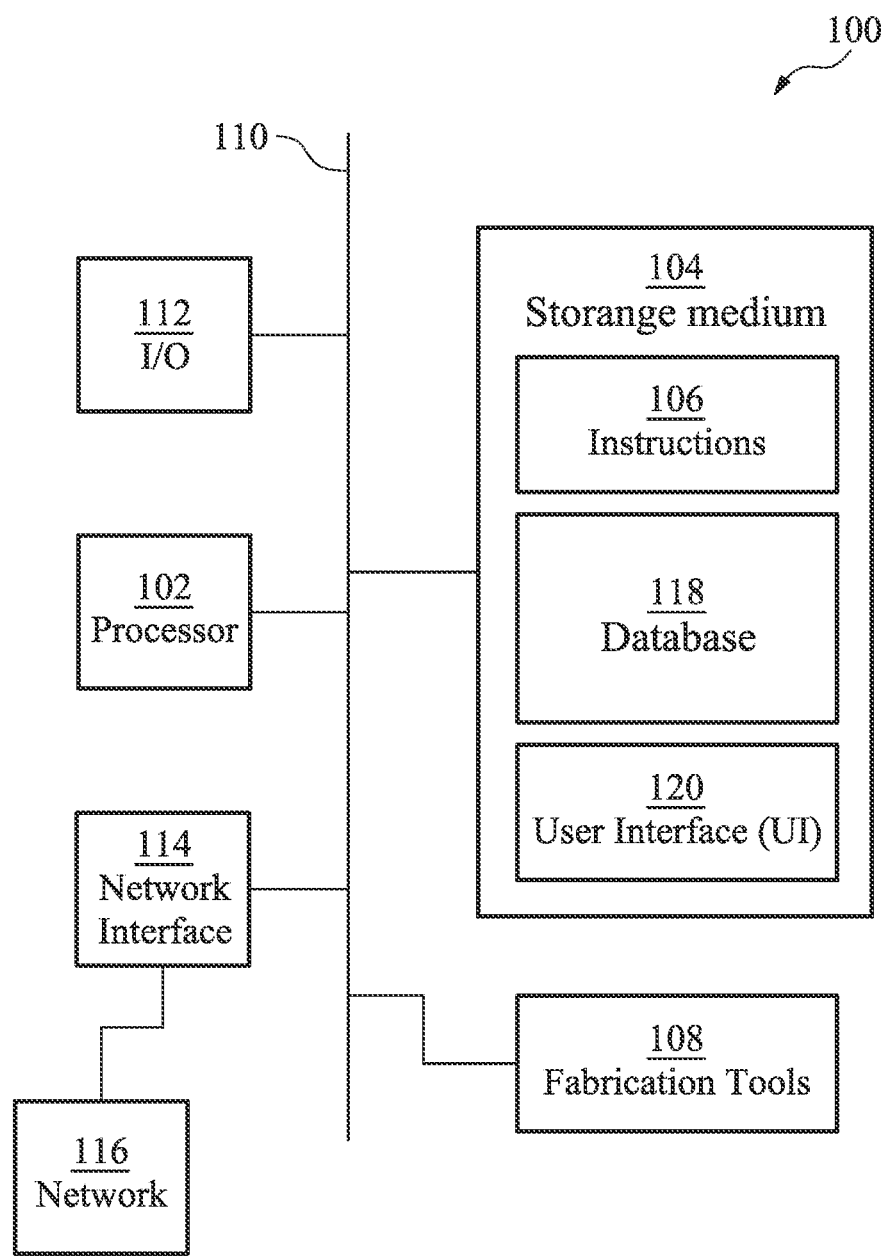
FIG. 2 is a block diagram schematically illustrating a computer system configured to provide a semiconductor device, in accordance with some embodiments.

FIG. 2 is a block diagram schematically illustrating an example of a computer system 100 configured to provide a semiconductor device, such as the semiconductor device 20 of FIG. 1, in accordance with some embodiments. Some or all the design, layout, and manufacture of ICs including dummy cells, such as the dummy cells 22 (shown in FIG. 1), and functional blocks, such as the functional blocks 24 (shown in FIG. 1), can be performed by or with the computer system 100. In some embodiments, the computer system 100 includes an engineering design automation (EDA) system.

In some embodiments, the system 100 is a general-purpose computing device including a processor 102 and a non-transitory, computer-readable storage medium 104. The computer-readable storage medium 104 may be encoded with, e.g., store, computer program code such as executable instructions 106. Execution of the instructions 106 by the processor 102 provides (at least in part) a tool that implements a portion or all the functions of the system 100, such as pre-layout simulations, post-layout simulations, component placement, DRC, routing of the IC, rerouting of the IC, and a final layout for manufacture. Further, fabrication tools 108 are included to further layout and physically implement the design, layout, and manufacture of the ICs. In some embodiments, the system 100 includes a commercial router. In some embodiments, the system 100 includes an automated place and route (APR) system. In some embodiments, the computer system 100 includes at least one PnR tool and, in some embodiments, the computer system 100 includes at least one FP checker that checks for design rule compliance.

The processor 102 is electrically coupled to the computer-readable storage medium 104 by a bus 110 and to an I/O interface 112 by the bus 110. A network interface 114 is also electrically connected to the processor 102 by the bus 110. The network interface 114 is connected to a network 116, so that the processor 102 and the computer-readable storage medium 104 can connect to external elements using the network 116. The processor 102 is configured to execute the computer program code or instructions 106 encoded in the computer-readable storage medium 104 to cause the system 100 to perform a portion or all the functions of the system 100. In some embodiments, the processor 102 is a central processing unit (CPU), a multi-processor, a distributed processing system, an application specific integrated circuit (ASIC), and/or a suitable processing unit.

In some embodiments, the computer-readable storage medium 104 is an electronic, magnetic, optical, electromagnetic, infrared, and/or semiconductor system or apparatus or device. For example, the computer-readable storage medium 104 can include a semiconductor or solid-state memory, a magnetic tape, a removable computer diskette, a random-access memory (RAM), a read-only memory (ROM), a rigid magnetic disk, and/or an optical disk. In some embodiments using optical disks, the computer-readable storage medium 104 can include a compact disk, read only memory (CD-ROM), a compact disk read/write memory (CD-R/W), and/or a digital video disc (DVD).

In some embodiments, the computer-readable storage medium 104 stores computer program code or instructions 106 configured to cause the system 100 to perform a portion or all the functions of the system 100. In some embodiments, the computer-readable storage medium 104 stores information which facilitates performing a portion or all the functions of the system 100. In some embodiments, the computer-readable storage medium 104 stores a database 118 that includes one or more of component libraries, digital circuit cell libraries, and databases. In some embodiments, the database 118 includes one or more of dummy cell libraries, STD logic cell libraries, and macro function libraries.

The system 100 includes the I/O interface 112, which is coupled to external circuitry. In some embodiments, the I/O interface 112 includes a keyboard, keypad, mouse, trackball, trackpad, touchscreen, and/or cursor direction keys for communicating information and commands to the processor 102.

The network interface 114 is coupled to the processor 102 and allows the system 100 to communicate with the network 116, to which one or more other computer systems are connected. The network interface 114 can include: wireless network interfaces such as BLUETOOTH, WIFI, WIMAX, GPRS, or WCDMA; or wired network interfaces such as ETHERNET, USB, or IEEE-1364. In some embodiments, a portion or all the functions of the system 100 can be performed in two or more systems that are like system 100.

The system 100 is configured to receive information through the I/O interface 112. The information received through the I/O interface 112 includes one or more of instructions, data, design rules, libraries of components and cells, and/or other parameters for processing by processor 102. The information is transferred to the processor 102 by the bus 110. Also, the system 100 is configured to receive information related to a user interface (UI) through the I/O interface 112. This UI information can be stored in the computer-readable storage medium 104 as a UI 120.

In some embodiments, a portion or all the functions of the system 100 are implemented via a standalone software application for execution by a processor. In some embodiments, a portion or all the functions of the system 100 are implemented in a software application that is a part of an additional software application. In some embodiments, a portion or all the functions of the system 100 are implemented as a plug-in to a software application. In some embodiments, at least one of the functions of the system 100 is implemented as a software application that is a portion of an EDA tool. In some embodiments, a portion or all the functions of the system 100 are implemented as a software application that is used by the system 100. In some embodiments, a layout diagram is generated using a tool such as VIRTUOSO available from CADENCE DESIGN SYSTEMS, Inc., or another suitable layout generating tool.

In some embodiments, the IC device layouts and other processes are realized as functions of a program stored in a non-transitory computer readable recording medium. Examples of a non-transitory computer readable recording medium include, but are not limited to, external/removable and/or internal/built-in storage or memory units, e.g., one or more optical disks such as a DVD, a magnetic disk such as a hard disk, a semiconductor memory such as a ROM and RAM, and a memory card, and the like.

As noted above, embodiments of the system 100 include fabrication tools 108 for implementing the manufacturing processes of the system 100. For example, based on the final layout, photolithographic masks may be generated, which are used to fabricate the IC by the fabrication tools 108.

Figure 3:
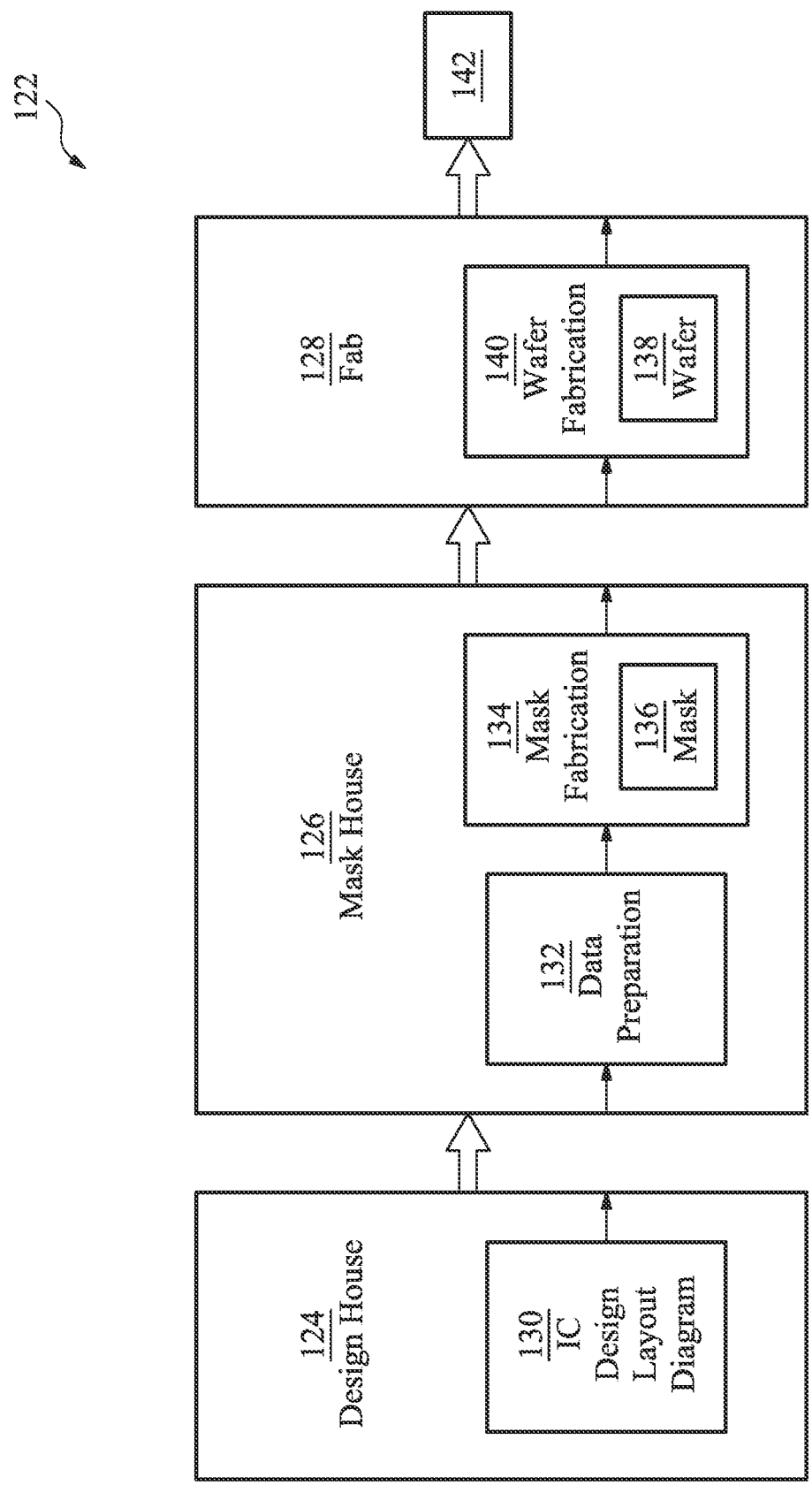
FIG. 3 is a block diagram of an IC manufacturing system and an IC manufacturing flow associated therewith, in accordance with some embodiments.

Further aspects of device fabrication are disclosed in conjunction with FIG. 3, which is a block diagram of an IC manufacturing system 122 and an IC manufacturing flow associated therewith, in accordance with some embodiments. In some embodiments, based on a layout diagram, one or more semiconductor masks and/or at least one component in a layer of a semiconductor IC is fabricated using the manufacturing system 122.

In FIG. 3, the IC manufacturing system 122 includes entities, such as a design house 124, a mask house 126, and an IC manufacturer/fabricator ("fab") 128, that interact with one another in the design, development, and manufacturing cycles and/or services related to manufacturing an IC, such as the ICs described herein. The entities in the system 122 are connected by a communications network. In some embodiments, the communications network is a single network. In some embodiments, the communications network is a variety of different networks, such as an intranet and the internet. The communications network includes wired and/or wireless communication channels. Each entity interacts with one or more of the other entities and provides services to and/or receives services from one or more of the other entities. In some embodiments, two or more of the design house 124, the mask house 126, and the IC fab 128 are owned by a single larger company. In some embodiments, two or more of the design house 124, the mask house 126, and the IC fab 128 coexist in a common facility and use common resources.

The design house (or design team) 124 generates an IC design layout diagram 130. The IC design layout diagram 130 includes various geometrical patterns, or IC layout diagrams designed for an IC device. The geometrical patterns correspond to patterns of metal, oxide, and/or semiconductor layers that make up the various components of the semiconductor structures to be fabricated. The various layers combine to form various IC features. For example, a portion of the IC design layout diagram 130 includes various IC features, such as diagonal vias, active areas or regions, gate electrodes, sources, drains, metal lines, local vias, and openings for bond pads, to be formed in a semiconductor substrate (such as a silicon wafer) and in various material layers disposed on the semiconductor substrate.

The design house 124 implements a design procedure to form an IC design layout diagram 130. The IC design layout diagram 130 is presented in one or more data files having information of the geometrical patterns. For example, IC design layout diagram 130 can be expressed in a GDSII file format or DFII file format. In some embodiments, the design procedure includes one or more of analog circuit design, digital logic circuit design, dummy cell design, functional block design, macro design, place and route routines, DRC, and physical layout design. In some embodiments, the design house 124 includes at least one PnR tool for component and/or functional block placement and routing. In some embodiments, the design house 124 includes at least one FP checker for checking compliance with design rules.

The mask house 126 includes data preparation 132 and mask fabrication 134. The mask house 126 uses the IC design layout diagram 130 to manufacture one or more masks 136 to be used for fabricating the various layers of the IC or semiconductor structure. The mask house 126 performs mask data preparation 132, where the IC design layout diagram 130 is translated into a representative data file (RDF). The mask data preparation 132 provides the RDF to the mask fabrication 134. The mask fabrication 134 includes a mask writer that converts the RDF to an image on a substrate, such as a mask (reticle) 136 or a semiconductor wafer 138. The design layout diagram 130 is manipulated by the mask data preparation 132 to comply with characteristics of the mask writer and/or criteria of the IC fab 128. In FIG. 3, the mask data preparation 132 and the mask fabrication 134 are illustrated as separate elements. In some embodiments, the mask data preparation 132 and the mask fabrication 134 can be collectively referred to as mask data preparation.

In some embodiments, the mask data preparation 132 includes an optical proximity correction (OPC) which uses lithography enhancement techniques to compensate for image errors, such as those that can arise from diffraction, interference, other process effects and the like. The OPC adjusts the IC design layout diagram 130. In some embodiments, the mask data preparation 132 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, the mask data preparation 132 includes a mask rule checker (MRC) that checks the IC design layout diagram 130 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 130 to compensate for limitations during the mask fabrication 134, which may undo part of the modifications performed by OPC to meet mask creation rules.

In some embodiments, the mask data preparation 132 includes lithography process checking (LPC) that simulates processing that will be implemented by the IC fab 128. LPC simulates this processing based on the IC design layout diagram 130 to create a simulated manufactured device. The processing parameters in LPC simulation can include parameters associated with various processes of the IC manufacturing cycle, parameters associated with tools used for manufacturing the IC, and/or other aspects of the manufacturing process. LPC considers various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine the IC design layout diagram 130.

The above description of mask data preparation 132 has been simplified for the purposes of clarity. In some embodiments, data preparation 132 includes additional features such as a logic operation (LOP) to modify the IC design layout diagram 130 according to manufacturing rules. Additionally, the processes applied to the IC design layout diagram 130 during data preparation 132 may be executed in a variety of different orders.

After the mask data preparation 132 and during the mask fabrication 134, a mask 136 or a group of masks 136 are fabricated based on the modified IC design layout diagram 130. In some embodiments, the mask fabrication 134 includes performing one or more lithographic exposures based on the IC design layout diagram 130. In some embodiments, an electron-beam (e-beam) or a mechanism of multiple e-beams is used to form a pattern on a mask (photomask or reticle) 136 based on the modified IC design layout diagram 130. The mask 136 can be formed in various technologies. In some embodiments, the mask 136 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region, and transmits through the transparent regions. In one example, a binary mask version of the mask 136 includes a transparent substrate (e.g., fused quartz) and an opaque material (e.g., chromium) coated in the opaque regions of the binary mask. In another example, the mask 136 is formed using a phase shift technology. In a phase shift mask (PSM) version of the mask 136, various features in the pattern formed on the phase shift mask are configured to have proper phase difference to enhance the resolution and imaging quality. In various examples, the phase shift mask can be attenuated PSM or alternating PSM. The mask(s) generated by the mask fabrication 134 is used in a variety of processes. For example, such a mask(s) is used in an ion implantation process to form various doped regions in the semiconductor wafer 138, in an etching process to form various etching regions in the semiconductor wafer 138, and/or in other suitable processes.

The IC fab 128 includes wafer fabrication 140. The IC fab 128 is an IC fabrication business that includes one or more manufacturing facilities for the fabrication of a variety of different IC products. In some embodiments, the IC fab 128 is a semiconductor foundry. For example, there may be a manufacturing facility for the front end of line (FEOL) fabrication of a plurality of IC products, while a second manufacturing facility may provide the back end of line (BEOL) fabrication for the interconnection and packaging of the IC products, and a third manufacturing facility may provide other services for the foundry business.

The IC fab 128 uses the mask(s) 136 fabricated by the mask house 126 to fabricate the semiconductor structures or ICs 142 of the current disclosure. Thus, the IC fab 128 at least indirectly uses the IC design layout diagram 130 to fabricate the semiconductor structures or ICs 142 of the current disclosure. Also, the semiconductor wafer 138 includes a silicon substrate or other proper substrate having material layers formed thereon, and the semiconductor wafer 138 further includes one or more of various doped regions, dielectric features, multilevel interconnects, and the like (formed at subsequent manufacturing steps). In some embodiments, the semiconductor wafer 138 is fabricated by the IC fab 128 using the mask(s) 136 to form the semiconductor structures or ICs 142 of the current disclosure. In some embodiments, the IC fabrication includes performing one or more lithographic exposures based at least indirectly on the IC design layout diagram 130.

As described above, in some embodiments, dummy cells, such as the dummy cells 22 (shown in FIG. 1), are pattern bridge cells configured to be situated between functional blocks having known layout patterns. In some embodiments, the dummy cells are asymmetric dummy cells situated between functional blocks having known layout patterns. Semiconductor devices including dummy cells and functional blocks are further described below with reference to the figures.

Figure 4:
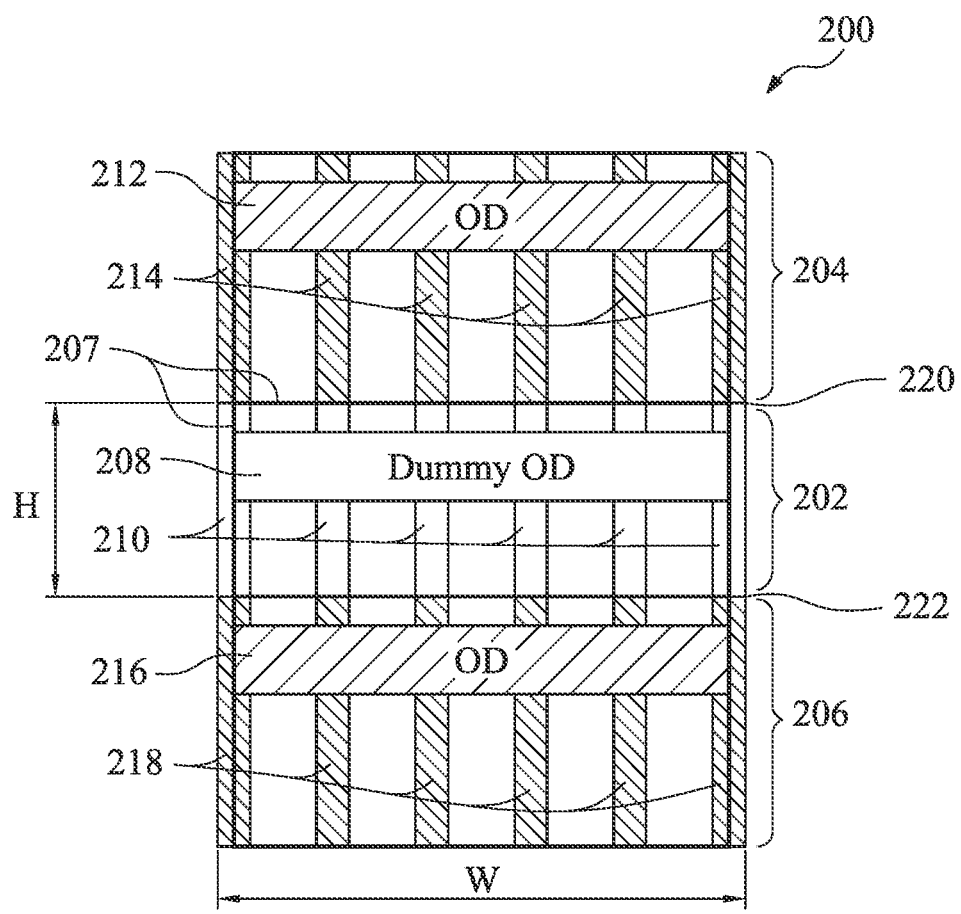
FIG. 4 is a diagram schematically illustrating a semiconductor device that includes a dummy cell and functional blocks, in accordance with some embodiments.

FIG. 4 is a diagram schematically illustrating a semiconductor device 200 that includes a dummy cell 202 and functional blocks 204 and 206, in accordance with some embodiments. The dummy cell 202 is a pattern bridge cell designed and configured to be situated between specific layout patterns, such as between specific layout patterns in the functional blocks 204 and 206. The "dummy" in dummy cell 202 refers, for example, to a cell that includes an active region and gates for filling space in the device and not for providing functional transistors in the device. The dummy cell 202 has a width W, a height H, and a cell boundary 207 that is defined by non-functioning active area 208 and non-functioning gates 210 for filling space between the functional blocks 204 and 206. The dummy cell 202 bridges the gap between the functional blocks 204 and 206. With the dummy cell 202, the area between the functional blocks 204 and 206 can be made smaller, such that the dummy cell 202 fills the gap between the functional blocks 204 and 206, without leaving space between the dummy cell 202 and the functional blocks 204 and 206. In some embodiments, the dummy cell 202 is like one of the dummy cells 22. In some embodiments, the functional blocks 204 and 206 are like the functional blocks 24. In some embodiments, the semiconductor device 200 is like the semiconductor device 20.

The dummy cell 202 includes a dummy active region 208 and dummy gate structures 210. The dummy active region 208 is situated in the top half of the dummy cell 202 such that the dummy cell 202 is an asymmetric dummy cell. In this example, the dummy active region 208 is situated closer to the functional block 204 and further away from the functional block 206. The dummy active region 208 is also referred to as a dummy oxide diffusion (OD) region, where "dummy" refers to an active region (OD region) that is not used to form a functional transistor. In other embodiments, the dummy cell 202 is a symmetric dummy cell that has the dummy active region 208 centered between the top and the bottom of the dummy cell 202.

The functional block 204 includes an active region 212 and gate structures 214 and the functional block 206 includes an active region 216 and gate structures 218. The functional blocks 204 and 206 include specific layout patterns, such that the dummy cell 202 is configured to be situated between the functional blocks 204 and 206. In some embodiments, the functional blocks 204 and 206 are different types of STD logic cells. In some embodiments, the functional blocks 204 and 206 are different types of macros. In some embodiments, one of the functional blocks 204 and 206 is a STD logic cell and the other one of the functional blocks 204 and 206 is a macro. In some embodiments, one of the functional blocks 204 and 206 is a STD logic cell and the other one of the functional blocks 204 and 206 is an SRAM block.

At the interface 220 between the dummy cell 202 and the functional block 204, the top edge layout region of the dummy cell 202 is configured to be situated next to the bottom edge layout region of the functional block 204. At the interface 222 between the dummy cell 202 and the functional block 206, the bottom edge layout region of the dummy cell 202 is configured to be situated next to the top edge layout region of the functional block 206. The dummy cell 202 is a pattern bridge cell designed and configured to be situated between specific layout patterns. For example, the width of the dummy cell 202 is designed and configured to correspond to the widths of the functional block 204 and the functional block 206, the height of the dummy cell 202 is designed and configured to fill the space between the functional block 204 and the functional block 206, the location of the active region 208 in the dummy cell 202 is situated in relation to the active regions in the functional block 204 and the functional block 206, and/or the gates are designed and configured to correspond to the gates in the functional block 204 and the functional block 206. In some embodiments, the dummy cell 202 is a pattern bridge cell designed and configured to be situated between and connect the functional blocks 204 and 206. In some embodiments, the dummy cell 202 is a pattern bridge cell designed and configured to be situated between and abut each of the functional blocks 204 and 206. In some embodiments, a PnR tool assists with inserting the dummy cell 202 between the functional blocks 204 and 206.

Figure 5:
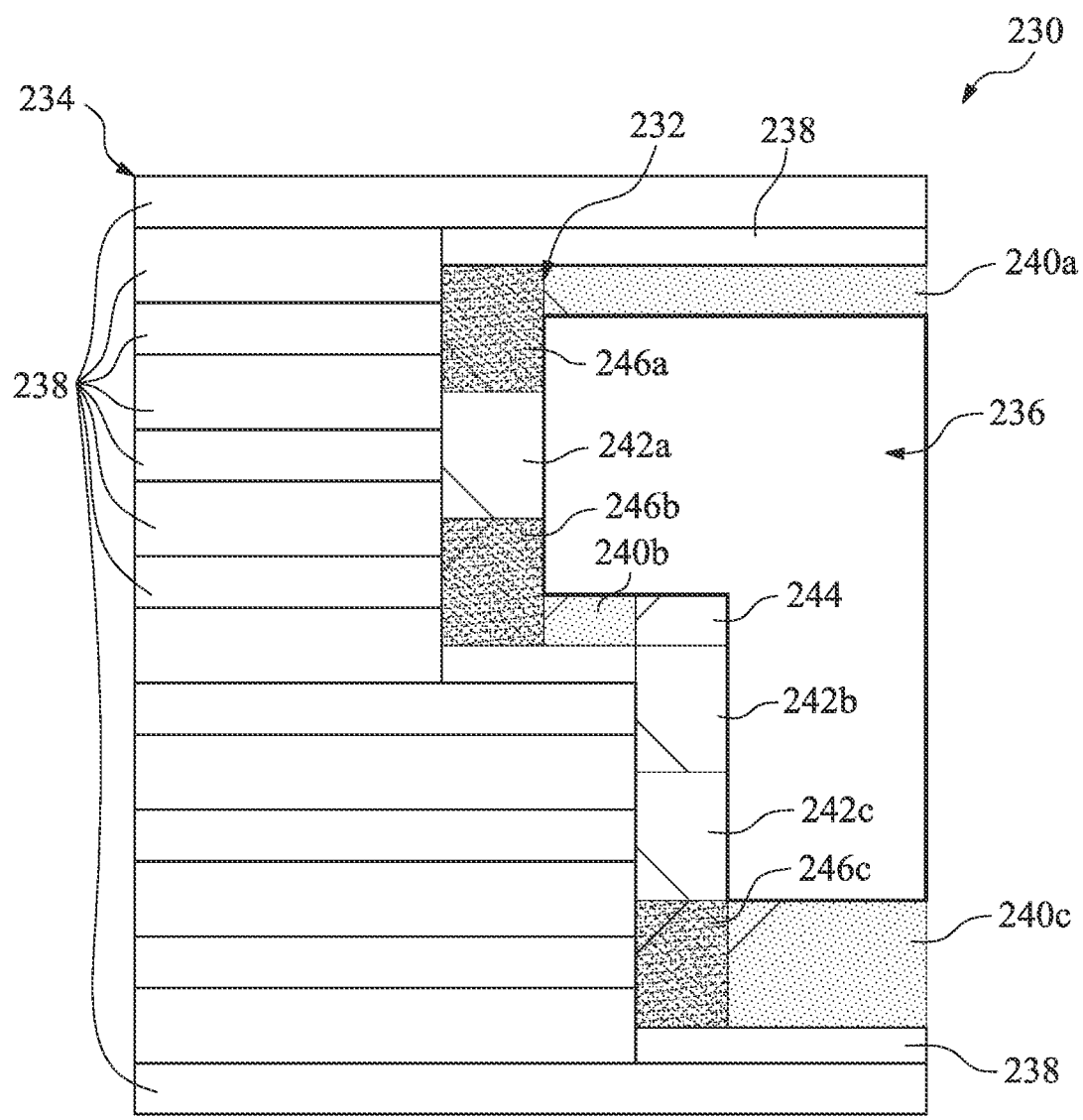
FIG. 5 is a diagram schematically illustrating a semiconductor device that includes a dummy cell area, a functional block area, and a macro area, in accordance with some embodiments.

FIG. 5 is a diagram schematically illustrating a semiconductor device 230 that includes a dummy cell area 232, a functional block area 234 on one side of the dummy cell area 232, and a macro area 236 on the other side of the dummy cell area 232, in accordance with some embodiments. The semiconductor device 230 includes a more complex layout, such that the dummy cell area 232 between the functional block area 234 and the macro area 236 is not a straight line. Instead, the dummy cell area 232 includes one or more indentations and/or steps that define the boundary between the functional block area 234 and the macro area 236. In some embodiments, the semiconductor device 230 is like the semiconductor device 20 of FIG. 1.

The functional block area 234 includes multiple functional blocks 238, such as STD logic cells and/or macros, arranged in rows. Also, the macro area 236 includes one or more functional blocks. In some embodiments, the macro area 234 includes one or more STD logic cells and/or macros. In some embodiments, the functional blocks 238 are like the functional blocks 24 (shown in FIG. 1). In some embodiments, the macro area 236 includes functional blocks like the functional blocks 24 (shown in FIG. 1).

The dummy cell area 232 includes different types of dummy cells. In this example, the dummy cell area 232 includes four different types of dummy cells 240a-240c, 242a-242c, 244, and 246a-246c. The dummy cells 240a-240c, 242a-242c, 244, and 246a-246c are asymmetric dummy cells configured to be situated between the functional blocks 238 of the functional block area 234 and the functional blocks of the macro area 236. Each of the dummy cells 240a-240c, 242a-242c, 244, and 246a-246c includes a triangular marker in one corner of the dummy cell for orienting the dummy cell in the dummy cell area 232. For example, the triangular marker can be used to indicate the position of an asymmetric active region in a dummy cell as either closer to the side with the triangular marker or further from the side with the triangular marker, for positioning the asymmetric active region of the dummy cell closer to the functional blocks 238 of the functional block area 234 or closer to the functional blocks of the macro area 236. Also, the triangular marker can be used to indicate the side of the dummy cell, such as the top side or the bottom side of the dummy cell, that is to be situated next to the functional blocks 238 of the functional block area 234 or next to the functional blocks of the macro area 236. Where, in some embodiments, the edge pattern layouts of the dummy cell including the gates of the dummy cell are configured to align with the edge pattern layouts including the gates of the functional blocks 238 of the functional block area 234 or the functional blocks of the macro area 236.

The first type of dummy cell is a row dummy cell 240a-240c, the second type of dummy cell is a right/left dummy cell 242a-242c, the third type of dummy cell is a 90-degree corner dummy cell 244, and the fourth type of dummy cell is a 270-degree in-corner dummy cell 246a-246c. In some embodiments, the dummy cells 240a-240c, 242a-242c, 244, and 246a-246c are like the dummy cells 22 (shown in FIG. 1).

The dummy cell area 232 includes a first row dummy cell 240a positioned horizontally at the top of the macro area 236 with the triangular marker in the lower left corner of the first row dummy cell 240a. This aligns edge pattern layouts along the top of the first row dummy cell 240a with the functional blocks 238 in the functional block area 234 and edge pattern layouts along the bottom of the first row dummy cell 240a with the functional blocks in the macro area 236.

The dummy cell area 232 includes a first 270-degree in-corner dummy cell 246a positioned next to the first row dummy cell 240a and situated with the triangular marker in the lower left corner of the first 270-degree in-corner dummy cell 246a. This aligns edge pattern layouts along the left side of the first 270-degree in-corner dummy cell 246a with the functional blocks 238 in the functional block area 234 and edge pattern layouts along the right side of the first 270-degree in-corner dummy cell 246a with the functional blocks in the macro area 236.

The dummy cell area 232 includes a first right/left dummy cell 242a below the first 270-degree in-corner dummy cell 246a and situated with the triangular marker in the lower left corner of the first right/left dummy cell 242a. This aligns edge pattern layouts along the left side of the first right/left dummy cell 242a with the functional blocks 238 in the functional block area 234 and edge pattern layouts along the right side of the first right/left dummy cell 242a with the functional blocks in the macro area 236.

The dummy cell area 232 includes a second 270-degree in-corner dummy cell 246b positioned below the first right/left dummy cell 242a and situated with the triangular marker in the upper left corner of the second 270-degree in-corner dummy cell 246b. This aligns edge pattern layouts along the left side of the second 270-degree in-corner dummy cell 246b with the functional blocks 238 in the functional block area 234 and edge pattern layouts along the right side of the second 270-degree in-corner dummy cell 246b with the functional blocks in the macro area 236.

The dummy cell area 232 includes a second row dummy cell 240b horizontally positioned next to the second 270-degree in-corner dummy cell 246b with the triangular marker in the upper left corner of the second row dummy cell 240b. This aligns edge pattern layouts along the bottom of the second row dummy cell 240b with the functional blocks 238 in the functional block area 234 and edge pattern layouts along the top of the second row dummy cell 240b with the functional blocks in the macro area 236.

The dummy cell area 232 includes a first 90-degree corner dummy cell 244 positioned next to the second row dummy cell 240b and situated with the triangular marker in the upper left corner of the first 90-degree corner dummy cell 244. This aligns edge pattern layouts along the top and right side of the first 90-degree corner dummy cell 244 with the functional blocks in the macro area 236.

The dummy cell area 232 includes a second right/left dummy cell 242b below the first 90-degree corner dummy cell 244 and situated with the triangular marker in the lower left corner of the second right/left dummy cell 242b. This aligns edge pattern layouts along the left side of the second right/left dummy cell 242b with the functional blocks 238 in the functional block area 234 and edge pattern layouts along the right side of the second right/left dummy cell 242b with the functional blocks in the macro area 236.

The dummy cell area 232 includes a third right/left dummy cell 242c below the second right/left dummy cell 242b and situated with the triangular marker in the lower left corner of the third right/left dummy cell 242c. This aligns edge pattern layouts along the left side of the third right/left dummy cell 242c with the functional blocks 238 in the functional block area 234 and edge pattern layouts along the right side of the third right/left dummy cell 242c with the functional blocks in the macro area 236.

The dummy cell area 232 includes a third 270-degree in-corner dummy cell 246c positioned below the third right/left dummy cell 242c and situated with the triangular marker in the upper left corner of the third 270-degree in-corner dummy cell 246c. This aligns edge pattern layouts along the left side and bottom of the third 270-degree in-corner dummy cell 246c with the functional blocks 238 in the functional block area 234.

The dummy cell area 232 includes a third row dummy cell 240c horizontally positioned next to the third 270-degree in-corner dummy cell 246c with the triangular marker in the upper left corner of the third row dummy cell 240c. This aligns edge pattern layouts along the bottom of the third row dummy cell 240c with the functional blocks 238 in the functional block area 234 and edge pattern layouts along the top of the third row dummy cell 240c with the functional blocks in the macro area 236.

As described above, the dummy cells 240a-240c, 242a-242c, 244, and 246a-246c are asymmetric dummy cells configured to be situated between the functional blocks 238 of the functional block area 234 and the functional blocks of the macro area 236. In some embodiments, the dummy cells 240a-240c, 242a-242c, 244, and 246a-246c are pattern bridge cells designed and configured to be situated between specific layout patterns, such as between the functional blocks 238 of the functional block area 234 and the functional blocks of the macro area 236.

The dummy cells 240a-240c, 242a-242c, 244, and 246a-246c bridge the gap between the functional blocks 238 of the functional block area 234 and the functional blocks of the macro area 236, such that the space between the functional blocks 238 of the functional block area 234 and the functional blocks of the macro area 236 can be made smaller and filled or nearly filled by the dummy cells 240a-240c, 242a-242c, 244, and 246a-246c.

FIGS. 6-9 are diagrams schematically illustrating a semiconductor device 300 and placement of dummy cells in the semiconductor device 300, in accordance with some embodiments. The dummy cells are placed between and/or next to functional blocks in the semiconductor device 300. In some embodiments, the dummy cells are directly placed in the semiconductor device 300. In some embodiments, dummy cell markers are placed in the semiconductor device 300 and later the dummy cell markers are replaced by dummy cells that correspond to the dummy cell markers. In some embodiments, the semiconductor device 300 is like the semiconductor device 20 of FIG. 1.

Figure 6:
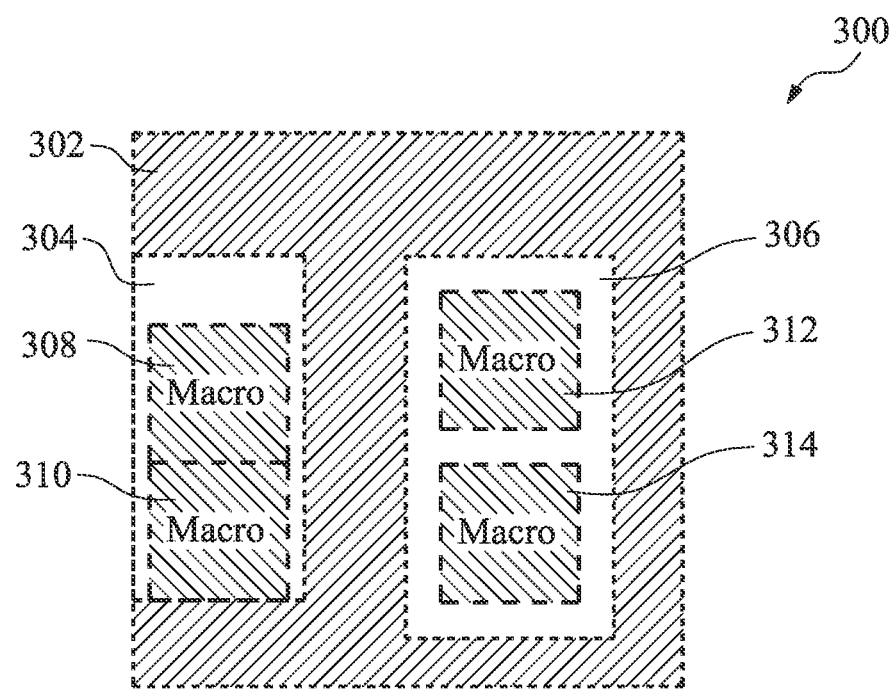
FIG. 6 is a diagram schematically illustrating a semiconductor device including a functional block core area, a first macro area, and a second macro area, in accordance with some embodiments.

FIG. 6 is a diagram schematically illustrating the semiconductor device 300 including a functional block core area 302, a first macro area 304, and a second macro area 306, in accordance with some embodiments. The functional block core area 302 includes multiple functional blocks, such as STD logic cells and/or macros. Also, the first macro area 304 includes a first macro 308 and a second macro 310 and the second macro area 306 includes a third macro 312 and a fourth macro 314. In some embodiments, the functional blocks in the functional block core area 302 and/or the functional block macros in the first macro area 304 and the second macro area 306 are like the functional blocks 24 (shown in FIG. 1).

A PnR tool is configured to place functional blocks, such as the STD logic cells and/or the macros, in the semiconductor device 300. Initially, in some embodiments, the PnR tool does not know or have information about the identity, i.e., the layout patterns, of the functional blocks placed in the semiconductor device 300. Also, in some embodiments, an FP checker checks whether placement of the functional blocks satisfies design layout rules, such as floorplan rules.

In some embodiments, the PnR tool is configured to place functional blocks, such as the STD logic cells and/or the macros, in the functional block core area 302. In some embodiments, the PnR tool is configured to place one or more of the first macro 308 and the second macro 310 in the first macro area 304, and one or more of the third macro 312 and the fourth macro 314 in the second macro area 306.

To perform further layout rule checking and to correct or change the floorplan layout, the PnR tool and/or the FP checker acquires the identity or layout patterns of the functional blocks placed in the semiconductor device 300. The PnR tool and/or the FP checker corrects or changes the floorplan layout of the semiconductor device 300 to avoid violating design layout rules.

Figure 7:
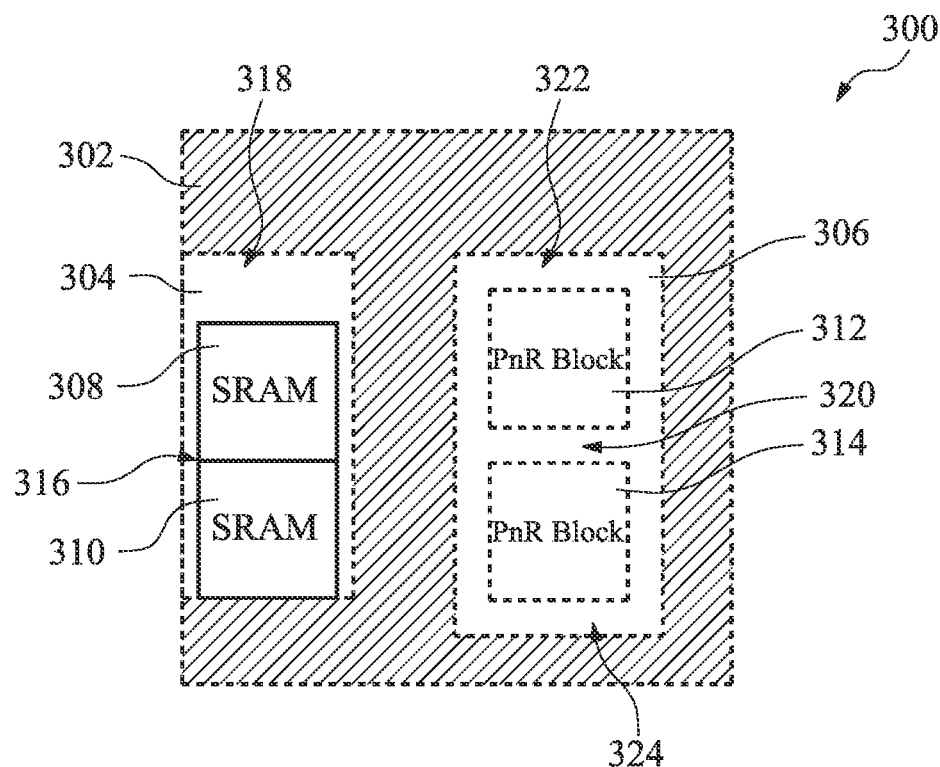
FIG. 7 is a diagram schematically illustrating the semiconductor device of FIG. 6 after the PnR tool and/or the FP checker has acquired the layout patterns of the functional blocks placed in the semiconductor device, in accordance with some embodiments.

FIG. 7 is a diagram schematically illustrating the semiconductor device 300 after the PnR tool and/or the FP checker has acquired the layout patterns of the functional blocks placed in the semiconductor device 300, in accordance with some embodiments.

The first macro 308 in the first macro area 304 is an SRAM block and the second macro 310 in the first macro area 304 is an SRAM block. The SRAM blocks of the first and second macros 308 and 310 abut one another at macro interface 316. The SRAM block of the first macro 308 is spaced away from the functional block core area 302, such as by the PnR tool and/or the FP checker after acquiring the layout patterns of the first and second macros 308 and 310, to provide a space 318 at the top of the first macro area 304.

The third macro 312 in the second macro area 306 is a PnR block that includes one or more functional blocks and the fourth macro 314 in the second macro area 306 is a PnR block that includes one or more functional blocks. The PnR blocks of the third and fourth macros 312 and 314 in the second macro area 306 are spaced apart, such as by the PnR tool and/or the FP checker after acquiring the layout patterns of the third and fourth macros 312 and 314, to provide a space 320 between the third and fourth macros 312 and 314 in the second macro area 306. Also, the PnR block of the third macro 312 in the second macro area 306 is spaced away from the functional block core area 302, such as by the PnR tool and/or the FP checker after acquiring the layout patterns of the third and fourth macros 312 and 314, to provide a space 322 between the third macro 312 and the functional block core area 302. In addition, the PnR block of the fourth macro 314 in the second macro area 306 is spaced away from the functional block core area 302, such as by the PnR tool and/or the FP checker after acquiring the layout patterns of the third and fourth macros 312 and 314, to provide a space 324 between the fourth macro 314 and the functional block core area 302.

The spaces 318, 320, 322, and 324 are configured to be filled directly by dummy cells, such as pattern bridge cells, or to be marked with dummy cell markers and filled later with dummy cells that correspond to the dummy cell markers.

Figure 8:
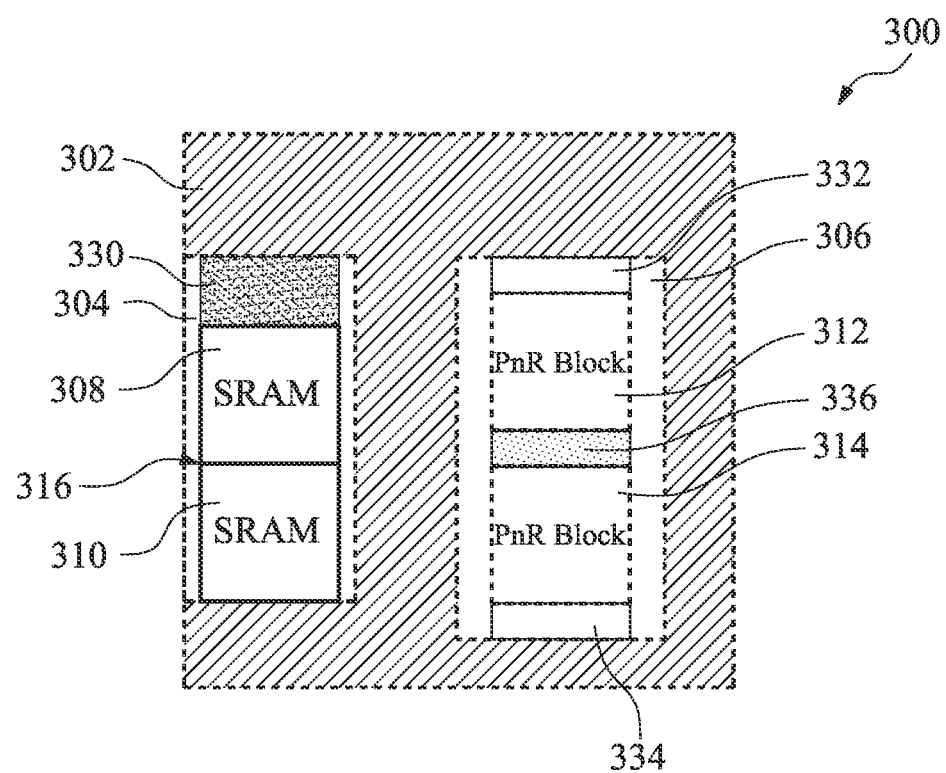
FIG. 8 is a diagram schematically illustrating the semiconductor device with dummy cells inserted in the semiconductor device, in accordance with some embodiments.

FIG. 8 is a diagram schematically illustrating the semiconductor device 300 with dummy cells 330, 332, 334, and 336 inserted in the semiconductor device 300, in accordance with some embodiments. The dummy cells 330, 332, 334, and 336 are inserted between and/or next to functional blocks in the semiconductor device 300. The dummy cells 330, 332, 334, and 336 include three different types of dummy cells. In some embodiments, the dummy cells 330, 332, 334, and 336 are like the dummy cells 22 (shown in FIG. 1).

A first type of dummy cell is dummy cell 330 that is configured to be inserted between the first macro 308 in the first macro area 304, which is an SRAM block, and the functional block core area 302. One side of the dummy cell 330 abuts the first macro 308 and the other, opposing, side of the dummy cell 330 abuts the functional block core area 302. The SRAM block of the first macro 308 is spaced away from the functional block core area 302 and the first dummy cell 330 is inserted in the space 318 between the first macro 308 and the functional block core area 302, such as by the PnR tool and/or the FP checker after acquiring the layout patterns of the first and second macros 308 and 310.

A second type of dummy cell includes dummy cell 332 that is configured to be inserted between the third macro 312 in the second macro area 306 and the functional block core area 302, and dummy cell 334 that is configured to be inserted between the fourth macro 314 in the second macro area 306 and the functional block core area 302. One side of the dummy cell 332 abuts the third macro 312 and the other, opposing, side of the dummy cell 332 abuts the functional block core area 302. Also, one side of the dummy cell 334 abuts the fourth macro 314 and the other, opposing, side of the dummy cell 334 abuts the functional block core area 302. The PnR block of the third macro 312 in the second macro area 306 is spaced away from the functional block core area 302 and the dummy cell 332 is inserted in the space 322 between the third macro 312 and the functional block core area 302, such as by the PnR tool and/or the FP checker after acquiring the layout patterns of the third and fourth macros 312 and 314. Also, the PnR block of the fourth macro 314 in the second macro area 306 is spaced away from the functional block core area 302 and the dummy cell 334 is inserted in the space 324 between the fourth macro 314 and the functional block core area 302, such as by the PnR tool and/or the FP checker after acquiring the layout patterns of the third and fourth macros 312 and 314.

A third type of dummy cell is dummy cell 336 that is configured to be inserted between the third macro 312 in the second macro area 306 and the fourth macro 314 in the second macro area 306. One side of the dummy cell 336 abuts the third macro 312 and the other, opposing, side of the dummy cell 336 abuts the fourth macro 314. The PnR blocks of the third and fourth macros 312 and 314 in the second macro area 306 are spaced apart and the dummy cell 336 is inserted in the space 320 between the third macro 312 and the fourth macro 314, such as by the PnR tool and/or the FP checker after acquiring the layout patterns of the third and fourth macros 312 and 314.

Figure 9:
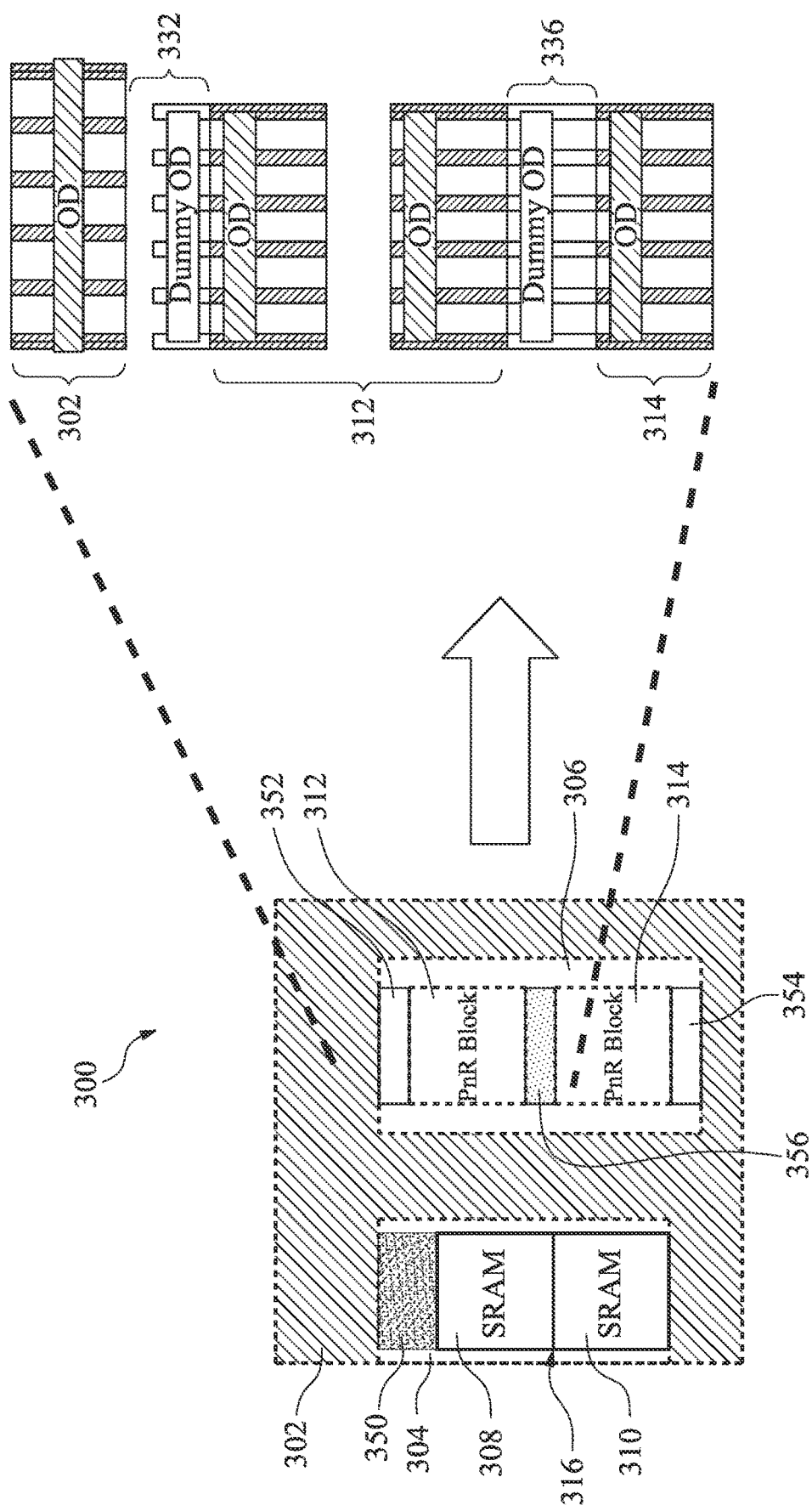
FIG. 9 is a diagram schematically illustrating the semiconductor device with dummy cell markers inserted in the layout of the semiconductor device, in accordance with some embodiments.

FIG. 9 is a diagram schematically illustrating the semiconductor device 300 with dummy cell markers 350, 352, 354, and 356 inserted in the layout of the semiconductor device 300, in accordance with some embodiments. The dummy cell markers 350, 352, 354, and 356 are inserted between and/or next to functional blocks in the semiconductor device 300 as placeholders for dummy cells, such as the dummy cells 330, 332, 334, and 336 (shown in FIG. 8). Later, a layout utility, such as one of the PnR tools, is used to insert the dummy cells 330, 332, 334, and 336 in the locations indicated by the dummy cell markers 350, 352, 354, and 356. In some embodiments, the layout utility is a dummy cell insertion tool. In some embodiments, the layout utility is a layout editor and/or a DRC utility. In some embodiments, the layout utility is part of the FP checker.

The dummy cell markers 350, 352, 354, and 356 include three different types of dummy cell markers. Dummy cell marker 350 is a first type of dummy cell marker that indicates dummy cell 330 is to be inserted between the first macro 308 in the first macro area 304, which is an SRAM block, and the functional block core area 302. The SRAM block of the first macro 308 is spaced away from the functional block core area 302 and the first dummy cell marker 350 is inserted in the space 318 between the first macro 308 and the functional block core area 302, such as by the PnR tool and/or the FP checker after acquiring the layout patterns of the first and second macros 308 and 310.

A second type of dummy cell marker includes dummy cell marker 352 that indicates dummy cell 332 is to be inserted between the third macro 312 in the second macro area 306 and the functional block core area 302, and dummy cell marker 354 that indicates dummy cell 334 is to be inserted between the fourth macro 314 in the second macro area 306 and the functional block core area 302. The PnR block of the third macro 312 in the second macro area 306 is spaced away from the functional block core area 302 and the dummy cell marker 352 is inserted in the space 322 between the third macro 312 and the functional block core area 302, such as by the PnR tool and/or the FP checker after acquiring the layout patterns of the third and fourth macros 312 and 314. Also, the PnR block of the fourth macro 314 in the second macro area 306 is spaced away from the functional block core area 302 and the dummy cell marker 354 is inserted in the space 324 between the fourth macro 314 and the functional block core area 302, such as by the PnR tool and/or the FP checker after acquiring the layout patterns of the third and fourth macros 312 and 314.

A third type of dummy cell marker is dummy cell marker 356 that indicates dummy cell 336 is to be inserted between the third macro 312 in the second macro area 306 and the fourth macro 314 in the second macro area 306. The PnR blocks of the third and fourth macros 312 and 314 in the second macro area 306 are spaced apart and the dummy cell marker 356 is inserted in the space 320 between the third macro 312 and the fourth macro 314, such as by the PnR tool and/or the FP checker after acquiring the layout patterns of the third and fourth macros 312 and 314.

Later, the layout utility is used to insert the dummy cells 330, 332, 334, and 336 in the locations indicated by the dummy cell markers 350, 352, 354, and 356. The dummy cell 330 is inserted in the location indicated by the dummy cell marker 350, the dummy cell 332 is inserted in the location indicated by the dummy cell marker 352, the dummy cell 334 is inserted in the location indicated by the dummy cell marker 354, and the dummy cell 336 is inserted in the location indicated by the dummy cell marker 356.

Figure 10:
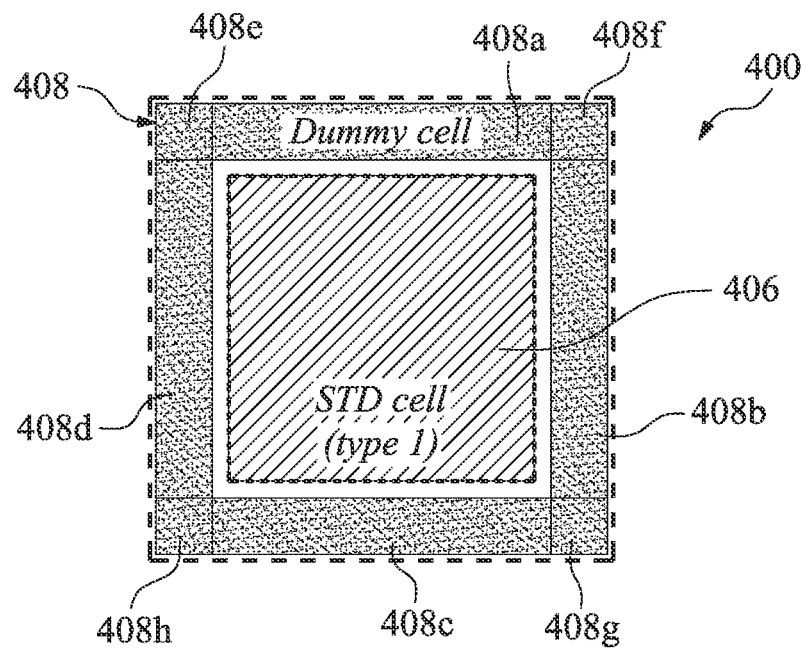
FIG. 10 is a diagram schematically illustrating a semiconductor device including a first type of functional block surrounded by dummy cells that are inserted along the edges of the first type of functional block, in accordance with some embodiments.
Figure 11:
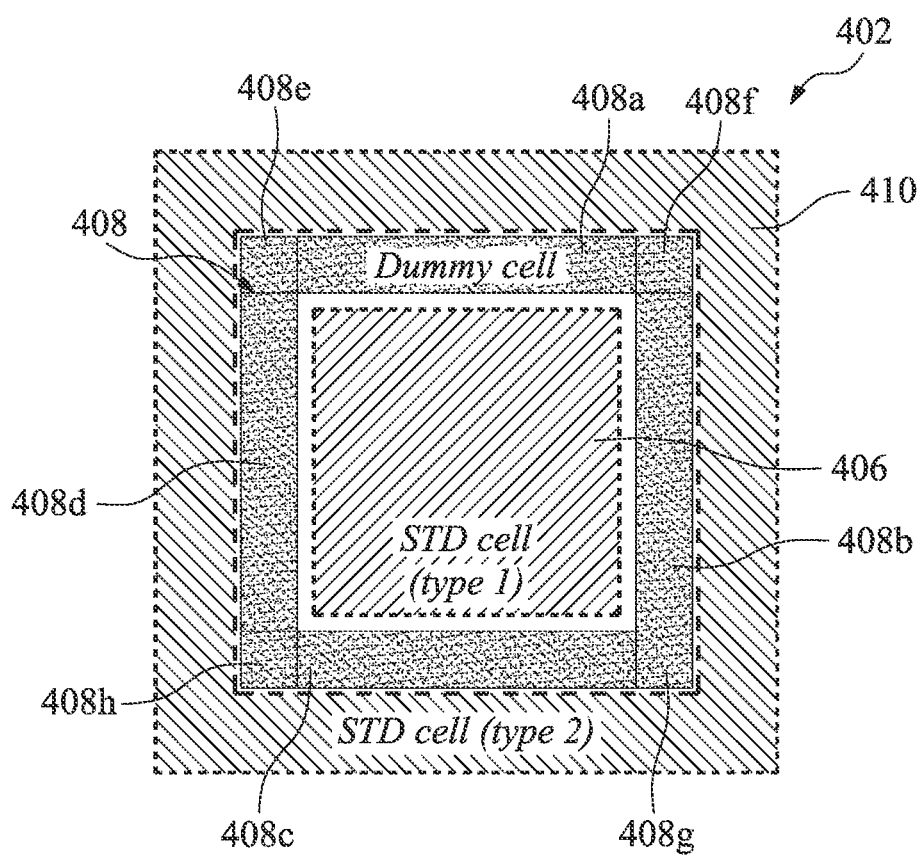
FIG. 11 is a diagram schematically illustrating the semiconductor device including the first type of functional block surrounded by the dummy cells inserted within the second type of functional block, in accordance with some embodiments.
Figure 12:
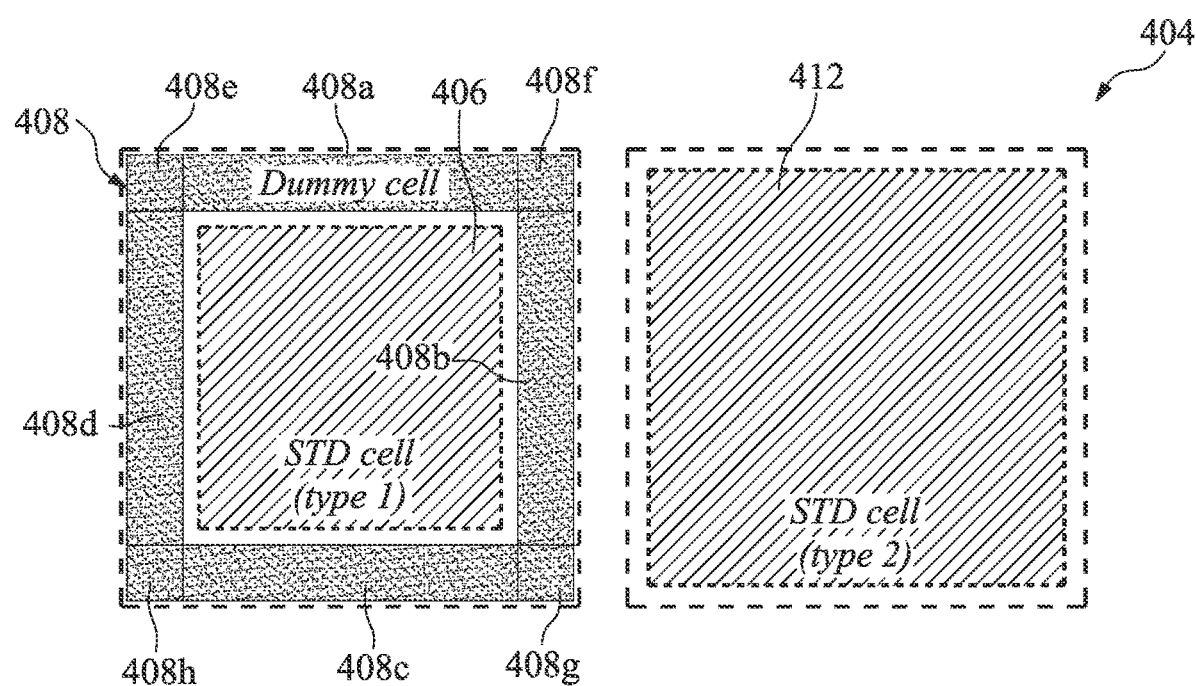
FIG. 12 is a diagram schematically illustrating the semiconductor device including the first type of functional block surrounded by the dummy cells inserted adjacent or next to the second type of functional block, in accordance with some embodiments.

FIGS. 10-12 are diagrams schematically illustrating semiconductor devices 400, 402, and 404 including a first type of functional block 406 having dummy cells 408 inserted along the edges of the first type of functional block 406 and bridged to a second type of functional block 410 and 412. In some embodiments, such as in semiconductor device 402, the first type of functional block 406 and the dummy cells 408 fit inside the second type of functional block 410. In some embodiments, such as in semiconductor device 404, the dummy cells 408 surrounding the first type of functional block 406 abut one side of the second type of functional block 412. In some embodiments, the dummy cells 408 are like the dummy cells 22 (shown in FIG. 1). In some embodiments, the functional blocks 406, 410, and 412 are like the functional blocks 24 (shown in FIG. 1). In some embodiments, each of the semiconductor devices 400, 402, and 404 is like the semiconductor device 20 of FIG. 1.

FIG. 10 is a diagram schematically illustrating the semiconductor device 400 including the first type of functional block 406 surrounded by the dummy cells 408 that are inserted along the edges of the first type of functional block 406, in accordance with some embodiments. The first type of functional block 406 includes STD logic cells (type 1). The dummy cells 408 include four elongated dummy cells 408a-408d and four corner dummy cells 408e-408h. In other embodiments, the first type of functional block 406 is a different type of functional block, such as a different STD logic cell or a different macro. Also, in other embodiments, the dummy cells 408 can include a different number of dummy cells, such as four elongated dummy cells that overlap or fit together in the corners.

FIG. 11 is a diagram schematically illustrating the semiconductor device 402 including the first type of functional block 406 surrounded by the dummy cells 408a-408h and inserted within the second type of functional block 410, in accordance with some embodiments. The first type of functional block 406 includes the STD logic cells (type 1) and the second type of functional block 410 includes STD logic cells (type 2). The dummy cells 408 include the four elongated dummy cells 408a-408d and the four corner dummy cells 408e-408h. In other embodiments, the first type of functional block 406 is a different type of functional block, such as a different STD logic cell or a different macro. Also, in other embodiments, the second type of functional block 410 is a different type of functional block, such as a different STD logic cell or a different macro. In addition, in other embodiments, the dummy cells 408 can include a different number of dummy cells, such as four elongated dummy cells that overlap or fit together in the corners.

The four elongated dummy cells 408a-408d and the four corner dummy cells 408e-408h bridge the first type of functional block 406 to the second type of functional block 410. In some embodiments, the four elongated dummy cells 408a-408d and the four corner dummy cells 408e-408h abut the first type of functional block 406 and abut the second type of functional block 410.

FIG. 12 is a diagram schematically illustrating the semiconductor device 404 including the first type of functional block 406 surrounded by the dummy cells 408a-408h and inserted adjacent or next to the second type of functional block 412, in accordance with some embodiments. The first type of functional block 406 includes the STD logic cells (type 1) and the second type of functional block 412 includes STD logic cells (type 2). The dummy cells 408 include the four elongated dummy cells 408a-408d and the four corner dummy cells 408e-408h. In other embodiments, the first type of functional block 406 is a different type of functional block, such as a different STD logic cell or a different macro. Also, in other embodiments, the second type of functional block 412 is a different type of functional block, such as a different STD logic cell or a different macro. In addition, in other embodiments, the dummy cells 408 can include a different number of dummy cells, such as four elongated dummy cells that overlap or fit together in the corners.

The four elongated dummy cells 408a-408d and the four corner dummy cells 408e-408h bridge the first type of functional block 406 to the second type of functional block 412. The four elongated dummy cells 408a-408d and the four corner dummy cells 408e-408h abut the first type of functional block 406 with the elongated dummy cell 408b and the two corner dummy cells 408f and 408g abutting the second type of functional block 412.

FIGS. 13-16 are diagrams schematically illustrating semiconductor devices 500, 502, and 504 including a first type of functional block 506 having modified boundary dummy cells 508 inserted along the edges of the first type of functional block 506 and bridged to a second type of functional block 510 and 512. In some embodiments, such as in semiconductor device 502, the first type of functional block 506 and the dummy cells 508 fit inside the second type of functional block 510. In some embodiments, such as in semiconductor device 504, the dummy cells 508 surrounding the first type of functional block 506 abut one side of the second type of functional block 510. In some embodiments, the dummy cells 508 are like the dummy cells 22 (shown in FIG. 1). In some embodiments, the functional blocks 506, 510, and 512 are like the functional blocks 24 (shown in FIG. 1). In some embodiments, each of the semiconductor devices 500, 502, and 504 is like the semiconductor device 20 of FIG. 1.

Figure 13:
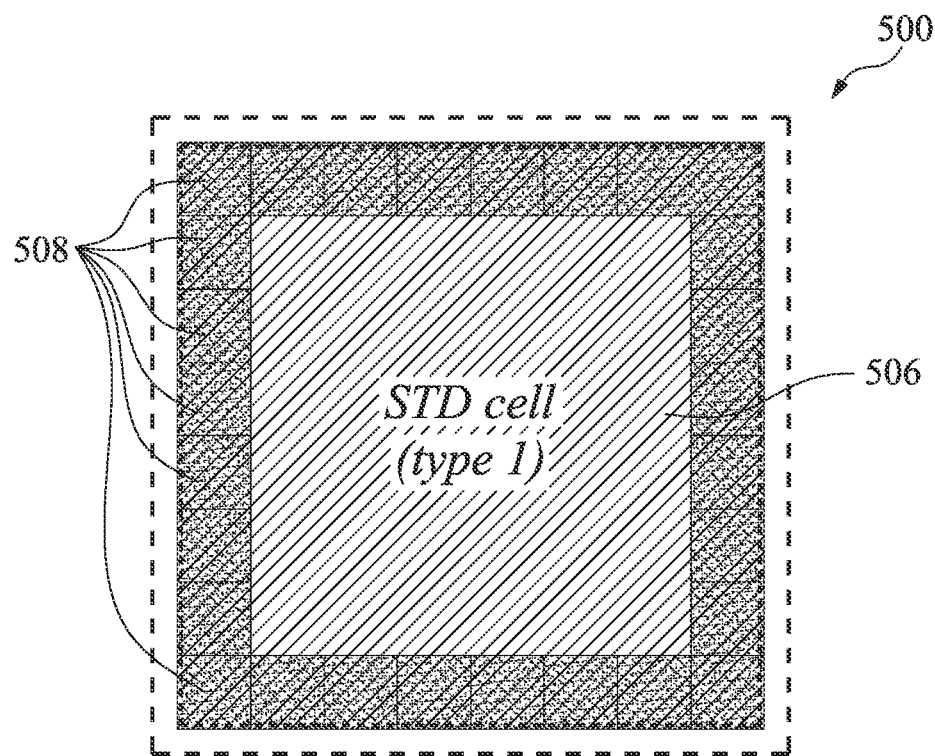
FIG. 13 is a diagram schematically illustrating a semiconductor device including a first type of functional block surrounded by dummy cells that are inserted along the edges and corners of the first type of functional block, in accordance with some embodiments.

FIG. 13 is a diagram schematically illustrating the semiconductor device 500 including the first type of functional block 506 surrounded by the dummy cells 508 that are inserted along the edges and corners of the first type of functional block 506, in accordance with some embodiments. The first type of functional block 506 includes STD logic cells (type 1). Each of the dummy cells 508 is a modified boundary dummy cell 508. In other embodiments, the first type of functional block 506 is a different type of functional block, such as a different STD logic cell or a different macro. Also, in other embodiments, the dummy cells 508 can include a different size and number of dummy cells.

Figure 14:
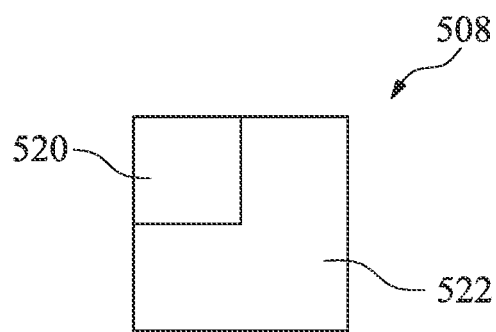
FIG. 14 is a diagram schematically illustrating a modified boundary dummy cell, in accordance with some embodiments.

FIG. 14 is a diagram schematically illustrating the dummy cell 508, in accordance with some embodiments. The dummy cell 508 includes a dummy cell layout pattern for bridging between the first type of functional block 506 and each of the second types of functional blocks 510 and 512. The dummy cell 508 is a modified boundary dummy cell 508 in that an original sized boundary cell 520 has been enlarged with a dummy cell enlargement portion 522.

Figure 15:
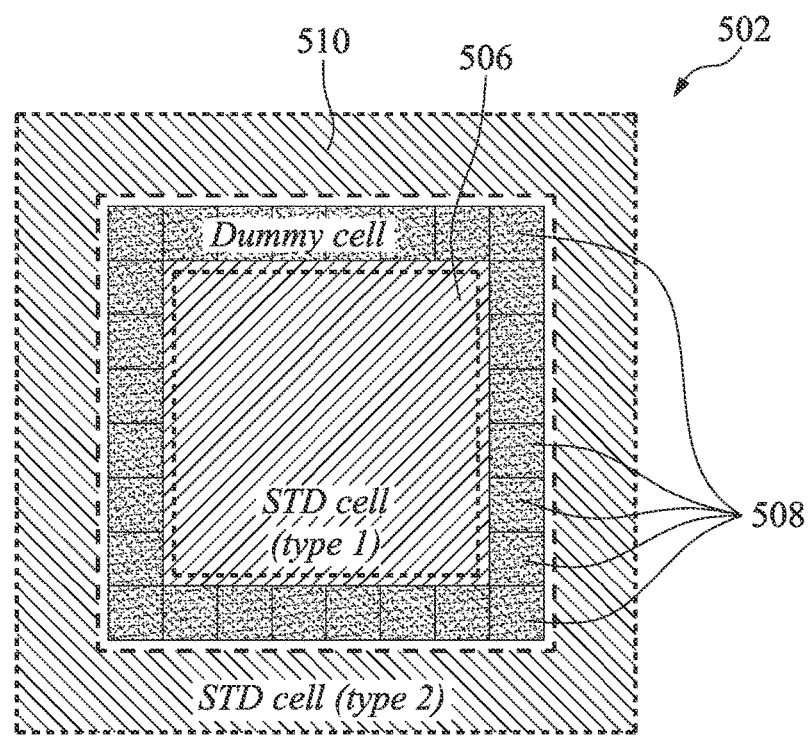
FIG. 15 is a diagram schematically illustrating the semiconductor device including the first type of functional block surrounded by the modified boundary dummy cells and inserted within a second type of functional block, in accordance with some embodiments.

FIG. 15 is a diagram schematically illustrating the semiconductor device 502 including the first type of functional block 506 surrounded by the modified boundary dummy cells 508 and inserted within the second type of functional block 510, in accordance with some embodiments. The first type of functional block 506 includes the STD logic cells (type 1) and the second type of functional block 510 includes STD logic cells (type 2). The dummy cells 508 bridge the gap between the first type of functional block 506 and the second type of functional block 510. In other embodiments, the first type of functional block 506 is a different type of functional block, such as a different STD logic cell or a different macro. Also, in other embodiments, the second type of functional block 510 is a different type of functional block, such as a different STD logic cell or a different macro. In addition, in other embodiments, the dummy cells 508 can include a different size and number of dummy cells.

The dummy cells 508 bridge the first type of functional block 506 to the second type of functional block 510. In some embodiments, the dummy cells 508 abut the first type of functional block 506 and/or abut the second type of functional block 510.

Figure 16:
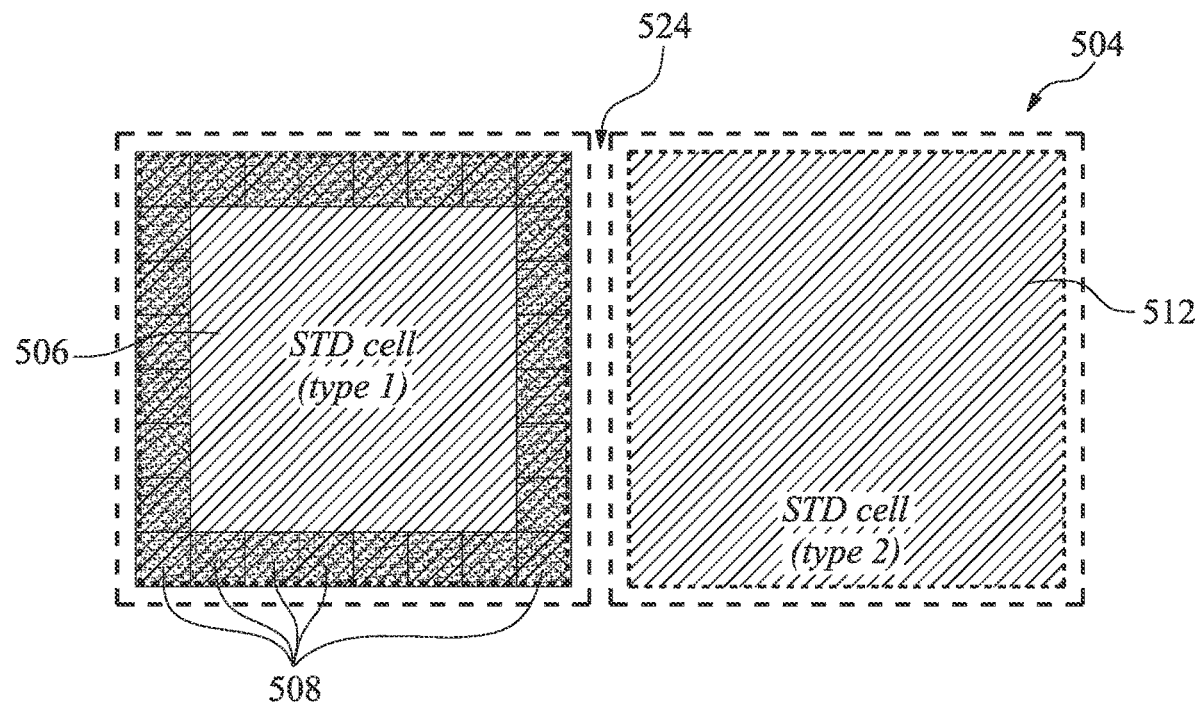
FIG. 16 is a diagram schematically illustrating the semiconductor device including the first type of functional block surrounded by the dummy cells and inserted adjacent or next to the second type of functional block, in accordance with some embodiments.

FIG. 16 is a diagram schematically illustrating the semiconductor device 504 including the first type of functional block 506 surrounded by the dummy cells 508 and inserted adjacent or next to the second type of functional block 512, in accordance with some embodiments. The first type of functional block 506 includes the STD logic cells (type 1) and the second type of functional block 512 includes STD logic cells (type 2). The dummy cells 508 along one edge 524 bridge the gap between the first type of functional block 506 and the second type of functional block 512. In other embodiments, the first type of functional block 506 is a different type of functional block, such as a different STD logic cell or a different macro. Also, in other embodiments, the second type of functional block 512 is a different type of functional block, such as a different STD logic cell or a different macro. In addition, in other embodiments, the dummy cells 508 can include a different size and number of dummy cells.

The dummy cells 508 bridge the first type of functional block 506 to the second type of functional block 512. The dummy cells 508 abut the first type of functional block 506 and the second type of functional block 512.

Figure 17:
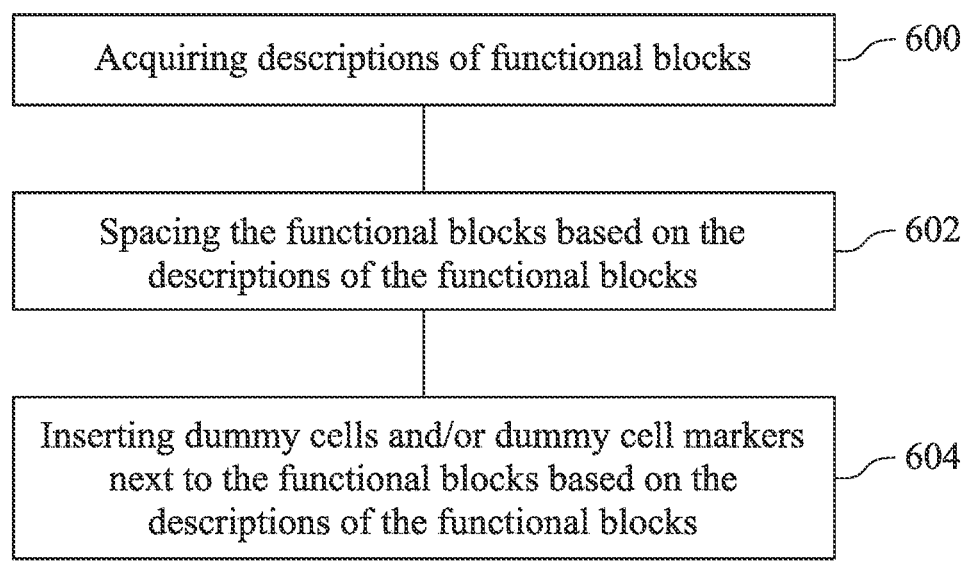
FIG. 17 is a diagram schematically illustrating a method of placing dummy cells in an integrated circuit, in accordance with some embodiments.

FIG. 17 is a diagram schematically illustrating a method of placing dummy cells in an integrated circuit, in accordance with some embodiments. In some embodiments, the dummy cells are like the dummy cells 22 (shown in FIG. 1). In some embodiments, the integrated circuit is like the semiconductor device 20 of FIG. 1.

At step 600, the method includes acquiring descriptions of functional blocks, such as the functional blocks 24 (shown in FIG. 1). The descriptions of the functional blocks can include the function performed, such as the logic function, and layout data or information, such as block width, height, active region locations, and gate spacing. In some embodiments, the descriptions of the functional blocks are acquired by a computer system, such as the computer system 100 of FIG. 2. In some embodiments, the descriptions of the functional blocks are acquired by a PnR tool, such as an FP checker. In some embodiments, the descriptions of the functional blocks are put into the system by an end user.

At step 602, the method includes spacing the functional blocks based on the descriptions of the functional blocks. In some embodiments, the functional blocks are spaced from one another and/or from other functional blocks by a PnR tool, such as the FP checker.

At step 604, the method includes inserting dummy cells and/or dummy cell markers next to the functional blocks based on the descriptions of the functional blocks. In some embodiments, the dummy cells and/or the dummy cell markers are inserted based on the description of the functional blocks by a PnR tool, such as the FP checker. In some embodiments, the method includes inserting dummy cells into locations indicated by the dummy cell markers, such as with a layout utility. In some embodiments, the layout utility is part of the PnR tools and/or part of a computer system, such as the computer system 100 of FIG. 2.

In some embodiments, the method includes inserting the dummy cells and/or the dummy cell markers at edges of a first functional block to fit the first functional block within a second functional block. In some embodiments, the method includes inserting the dummy cells at edges of a first functional block to abut the dummy cells with the first functional block and a second functional block. In some embodiments, the method includes inserting the dummy cells and/or the dummy cell markers at edges of a first functional block to fill a gap between the first functional block and a second functional block. In some embodiments, the method includes inserting dummy cells and/or dummy cell markers between two functional blocks and directly abutting the dummy cells to each of the two functional blocks.

Disclosed embodiments thus provide dummy cells that are situated between functional blocks. In some embodiments, the dummy cells are pattern bridge cells configured to be situated between functional blocks having known layout patterns. In some embodiments, the dummy cells are configured to be situated between selected patterns, such as between different types of STD logic cells, between different types of macros, between STD logic cells and macros, and/or between STD logic cells and SRAM blocks. In some embodiments, the dummy cells are asymmetric dummy cells. Also, in some embodiments, the dummy cells are configured to be situated between functional blocks in more complex layout patterns.

Disclosed embodiments further provide dummy cells inserted along the edges of one type of functional block to bridge the one type of functional block to another type of functional block. In some embodiments, the one type of functional block with the surrounding dummy cells is inserted into the other type of functional block. In some embodiments, the one type of functional block with the surrounding dummy cells is inserted next to the other type of functional block to abut with the other type of functional block.

Further disclosed embodiments include systems and/or methods for identifying patterns or styles of functional blocks and moving the functional blocks to have predetermined spaces next to or around the functional blocks, such that the spaces can be filled by one or more dummy cells and/or one or more pattern bridge cells. Also, disclosed embodiments include identifying patterns or styles of functional blocks and placing dummy cells or dummy cell markers next to the functional blocks using a PnR tool, such as an FP checker. In some embodiments, the dummy cell markers are replaced with selected dummy cells at a later stage using a layout utility, such as a dummy cell insertion tool, a DRC utility, and/or a layout editor.

Advantages of the disclosed embodiments include smaller chip areas and a shorter design turn-around cycle.

In accordance with some embodiments, a device includes functional blocks and dummy cells. The functional blocks include a first functional block and a second functional block. Each dummy cell having a cell boundary defined by non-functioning active areas and non-functioning gates for filling space between the functional blocks and including a dummy cell configured to be situated between the first functional block and the second functional block such that the dummy cell directly abuts each of the first functional block and the second functional block In accordance with further embodiments, a system includes a place and route tool configured to place functional blocks in an integrated circuit and a floorplan checker configured to check whether placement of the functional blocks satisfies floorplan rules. The system is configured to receive descriptions of the functional blocks that include layout data on the functional blocks and to insert dummy cells and/or dummy cell markers next to the functional blocks based on the descriptions of the functional blocks.

In accordance with still further disclosed aspects, a method of placing dummy cells in an integrated circuit includes acquiring descriptions of functional blocks that include layout data on the functional blocks; spacing the functional blocks based on the descriptions of the functional blocks; and inserting dummy cells and/or dummy cell markers next to the functional blocks based on the descriptions of the functional blocks.

This disclosure outlines various embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:
1. A device, comprising:
functional blocks including a first functional block and a second functional block; and
dummy cells, each dummy cell having a cell boundary defined by non-functioning active areas and non-functioning gates for filling space between the functional blocks and including a first dummy cell having a first top edge and a first bottom edge situated between the first functional block and the second functional block such that the first dummy cell directly abuts each of the first functional block and the second functional block where the first top edge of the first dummy cell is situated next to a second bottom edge of the first functional block without leaving space between the first dummy cell and the first functional block and the first bottom edge of the first dummy cell is situated next to a second top edge of the second functional block without leaving space between the first dummy cell and the see functional block.

2. The device of claim 1, wherein the first dummy cell is asymmetric and includes one side configured to abut the first functional block and another side configured to abut the second functional block.

3. The device of claim 1, wherein the first dummy cell is symmetric such that the first dummy cell includes a first side configured to abut each of the first functional block and the second functional block and a second side configured to abut each of the first functional block and the second functional block.

4. The device of claim 1, wherein the first functional block includes a layout pattern, and the second functional block includes the layout pattern.

5. The device of claim 1, wherein the first functional block includes a first standard cell layout pattern, and the second functional block includes a second standard cell layout pattern that is different than the first standard cell layout pattern.

6. The device of claim 1, wherein the first functional block includes a standard cell block, and the second functional block includes a static random-access memory block.

7. The device of claim 1, wherein at least one of the functional blocks directly abuts another one of the functional blocks.

8. The device of claim 1, comprising a second dummy cell of the dummy cells configured to be situated on at least one side of the first functional block and/or on at least one side of the second functional block.

9. The device of claim 1, wherein the dummy cells include a row dummy cell, a right/left dummy cell, a 90-degree corner dummy cell, and a 270-degree in-corner dummy cell.

10. A device, comprising:
a first functional block having a first top edge and a first bottom edge;
a second functional block having a second top edge and a second bottom edge;
a dummy cell that includes at least one non-functioning active area and at least one non-functioning gate, the dummy cell having a third top edge and a third bottom edge situated between the first functional block and the second functional block,
wherein the third top edge of the dummy cell is situated next to the first bottom edge of the first functional block without leaving space between the dummy cell and the first functional block and the third bottom edge of the dummy cell is situated next to the second top edge of the second functional block without leaving space between the dummy cell and the second functional block.

11. The device of claim 10, wherein the dummy cell is asymmetric and includes one side configured to abut the first functional block and another side configured to abut the second functional block.

12. The device of claim 10, wherein the dummy cell is symmetric such that the dummy cell includes a first side configured to abut each of the first functional block and the second functional block and a second side configured to abut each of the first functional block and the second functional block.

13. The device of claim 10, wherein the first functional block includes a standard cell layout pattern and the second functional block includes the standard cell layout pattern.

14. The device of claim 10, wherein the first functional block includes a first standard cell layout pattern and the second functional block includes a second standard cell layout pattern that is different than the first standard cell layout pattern.

15. The device of claim 10, wherein the first functional block includes a standard cell block and the second functional block includes a static random-access memory block.

16. The device of claim 10, wherein the first functional block includes a standard cell block and the second functional block includes a macro block.

17. A device, comprising:
a first functional block having first gate structures extending in a first direction;
a second functional block having second gate structures extending in the first direction;
a first dummy cell situated between the first functional block and the second functional block, the first dummy cell including at least one non-functioning active area and at least one non-functioning gate structure that extends in the first direction,
wherein the first dummy cell is situated next to the first functional block without leaving space between the first dummy cell and the first functional block and the first dummy cell is situated next to the second functional block without leaving space between the first dummy cell and the second functional block, and the first gate structures are aligned in a second direction that is perpendicular to the first direction with the at least one non-functioning gate structure and the second gate structures are aligned in the second direction with the at least one non-functioning gate structure.

18. The device of claim 17, wherein the first dummy cell is asymmetric and includes one side configured to abut the first functional block and another side configured to abut the second functional block.

19. The device of claim 17, wherein the first dummy cell is symmetric such that the first dummy cell includes a first side configured to abut each of the first functional block and the second functional block and a second side configured to abut each of the first functional block and the second functional block.

20. The device of claim 17, comprising a second dummy cell situated next to the first functional block without leaving space between the second dummy cell and the first functional block.

* * * * *